US011223740B1

(12) United States Patent
Chung et al.

(10) Patent No.: US 11,223,740 B1
(45) Date of Patent: Jan. 11, 2022

(54) POWER SWITCHING DEVICE AND IMAGE PROCESSING DEVICE WITH POWER SWITCHING DEVICE

(71) Applicant: HONG FU JIN PRECISION INDUSTRY (WuHan) CO., LTD., Wuhan (CN)

(72) Inventors: Ming-Hung Chung, New Taipei (TW); Hsiu-Hao Cheng, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 0 days.

(21) Appl. No.: 17/000,626

(22) Filed: Aug. 24, 2020

Related U.S. Application Data

(63) Continuation-in-part of application No. PCT/CN2020/106323, filed on Jul. 31, 2020.

(51) Int. Cl.
*H04N 1/12* (2006.01)
*H04N 1/31* (2006.01)
*H04N 1/00* (2006.01)

(52) U.S. Cl.
CPC ......... *H04N 1/121* (2013.01); *H04N 1/00602* (2013.01); *H04N 1/31* (2013.01); *H04N 1/00588* (2013.01)

(58) Field of Classification Search
CPC ....... H04N 21/47202; H04N 21/25858; H04N 7/17309; H04N 21/25833; H04N 21/25825; H04N 21/26216; H04N 21/26283; H04N 21/2662; H04N 21/42676; H04N 21/4516; H04N 21/4532; H04N 21/454; H04N 21/4627; H04N 21/4821; H04N 21/6168;
(Continued)

(56) References Cited

U.S. PATENT DOCUMENTS 7,733,538 B2 * 6/2010 Kanesaka ............ H04N 1/0315
358/474
8,730,532 B2 5/2014 Lee
(Continued)

FOREIGN PATENT DOCUMENTS

CN 1592349 A 3/2005
CN 103716497 A 4/2014
(Continued)

*Primary Examiner* — Negussie Worku
(74) *Attorney, Agent, or Firm* — ScienBiziP, P.C.

(57) ABSTRACT

A power switching device includes a translation mechanism, an active mechanism, and a transmission mechanism. The translation mechanism includes a rack. The active mechanism includes an active gear and a driver. The active gear connects with a first functional mechanism, and the driver drives the active gear to rotate in a first direction or a second direction. The transmission mechanism connects with a second functional mechanism. The active gear is switched between a first position and a second position. In the first position, the active gear is connected to the transmission mechanism and rotates in the first direction to drive the transmission mechanism to rotate, thereby driving the second functional mechanism to operate. In the second position, the active gear meshes with the rack and rotates in the first direction or the second direction to reciprocate on the rack so as to drive the first functional mechanism to operate.

18 Claims, 12 Drawing Sheets

(58) Field of Classification Search
CPC ............ H04N 21/6371; H04N 21/643; H04N 21/6582; H04N 21/835; H04N 1/00602; H04N 1/00628; H04N 1/00649; H04N 21/2225; H04N 21/2402; H04N 21/2668; H04N 21/4424; H04N 21/44245; H04N 21/6118; H04N 7/17318
USPC ........................................................ 358/498
See application file for complete search history.

(56) References Cited

U.S. PATENT DOCUMENTS

| | | | |
|---|---|---|---|
| 8,983,359 B2 * | 3/2015 | Hirokawa | H04N 1/00519 399/380 |
| 2004/0057071 A1 * | 3/2004 | Lin | H04N 1/00904 358/1.15 |
| 2004/0099090 A1 * | 5/2004 | Hsu | F16H 3/34 74/665 GA |
| 2005/0002710 A1 * | 1/2005 | Ishikura | G03G 15/605 399/367 |
| 2010/0308528 A1 * | 12/2010 | Chung | B65H 3/565 271/117 |
| 2014/0029070 A1 * | 1/2014 | Morinaga | H04N 1/0057 358/497 |
| 2014/0146372 A1 | 5/2014 | Shingai et al. | |
| 2015/0224845 A1 * | 8/2015 | Anderson | B60G 17/052 701/37 |
| 2016/0291499 A1 * | 10/2016 | Shibuya | G03G 15/0189 |
| 2017/0289376 A1 * | 10/2017 | Hikichi | H04N 1/00891 |
| 2018/0172119 A1 | 6/2018 | Lin et al. | |
| 2018/0176403 A1 * | 6/2018 | Ueda | H04N 1/32379 |
| 2019/0037095 A1 * | 1/2019 | Funakawa | G03G 15/5004 |
| 2019/0193967 A1 * | 6/2019 | Shuto | H04N 1/00628 |

FOREIGN PATENT DOCUMENTS

| | | |
|---|---|---|
| CN | 103856676 A | 6/2014 |
| CN | 203708322 U | 7/2014 |
| CN | 108234797 A | 6/2018 |

\* cited by examiner

POWER SWITCHING DEVICE AND IMAGE PROCESSING DEVICE WITH POWER SWITCHING DEVICE

FIELD

The application relates to a power switching device and an image processing device with the device.

BACKGROUND

An image scanning device with an automatic paper feeding device includes a flatbed scanning mechanism and an automatic paper feeding mechanism. These two mechanisms usually have their own power source to drive the flatbed scanning mechanism and the automatic paper feeding mechanism, but there is a problem of high cost.

SUMMARY OF THE DISCLOSURE

In view of this, it is necessary to provide a power switching device that can share the same power source for reciprocating translational motion and rotational motion.

An embodiment of the present application provides a power switching device for switching power between a first functional mechanism and a second functional mechanism, including:

A translation mechanism, including a rack;

An active mechanism including an active gear and a driver, the driver is connected to the active gear, the active gear is used to connect with a first functional mechanism, and the driver can drive the active gear to rotate in a first direction or a second direction opposite to the first direction;

A transmission mechanism for connecting with the second functional mechanism; and A locking mechanism connected to the transmission mechanism for limiting the transmission mechanism to transmit in a single direction;

The active gear can be switched between a first position and a second position; in the first position, the active gear is connected to the transmission mechanism and rotates in the first direction to drive the transmission mechanism to rotate, thereby driving the second functional mechanism to operate; in the second position, the active gear meshes with the rack and rotates in the second direction to move on the rack, thereby being used for driving the operation of the first functional mechanism.

In one embodiment, the transmission mechanism includes:

A first transmission gear used to connect with the second functional mechanism and including a first toothing portion;

A second transmission gear coaxial with the first transmission gear and including:

A second toothing portion used to engage the first toothing portion to drive the first transmission gear to rotate;

A resilient member connected to the second transmission gear for pushing the second transmission gear in a direction away from the first transmission gear, so that the second transmission gear is separated from the active gear;

The active mechanism also includes:

A pushing member moving with the active gear. When the active gear moves to the transmission mechanism, it pushes the second transmission gear in the direction of the first transmission gear, so that the second transmission gear and the active gear are meshed, and the second toothing portion is engaged with the first toothing portion.

In one embodiment, the transmission mechanism further includes:

A fixed shaft, the first transmission gear, the second transmission gear and the resilient member are sleeved on the fixed shaft;

A pressing member sleeved on the fixed shaft and located on a side of the second transmission gear away from the resilient member and used for contacting the pushing member and pushing the second transmission gear;

A limiting member arranged at an end of the fixed shaft adjacent to the pressing member and used for limiting the first transmission gear, the second transmission gear, the resilient member and the pressing member.

In one embodiment, the pressing member is provided with an extension piece, and the extension piece extends in the direction of the pushing member. A side of the pressing member adjacent to the extension piece is provided with a curved surface. When the pushing member moves toward the pressing member, the pushing member causes the extension piece to slide relative to the curved surface to press the extension piece and push the second transmission gear toward the first transmission gear.

In one embodiment, one end of the extension piece adjacent to the pushing member is provided with a round corner to reduce friction.

In one embodiment, the locking mechanism includes a locking gear, a ratchet wheel, and a pawl. The locking gear is coaxially fixedly connected with the ratchet wheel, the locking gear meshes with the third transmission gear, and the pawl is used to restrict reversal of the ratchet wheel and the locking gear, thereby restricting the reversal of the transmission mechanism.

In one embodiment, the active mechanism further includes a worm gear and a worm. The worm gear is coaxially fixedly connected with the active gear, one end of the worm is connected to the driver, and the other end is engaged with the worm gear. The driver is used for driving the worm to rotate to drive the worm gear and the active gear to rotate.

An embodiment of the present application also provides an image processing device, including an image reading mechanism and a paper feeding mechanism, and further including:

A translation mechanism, including a rack;

An active mechanism including an active gear and a driver, the driver is connected to the active gear, the active gear is used to connect with a first functional mechanism, and the driver can drive the active gear to rotate in a first direction or a second direction opposite to the first direction;

A transmission mechanism for connecting with the second functional mechanism; and A locking mechanism connected to the transmission mechanism for limiting the transmission mechanism to transmit in a single direction;

The active gear can be switched between a first position and a second position; in the first position, the active gear is connected to the transmission mechanism and rotates in the first direction to drive the transmission mechanism to rotate, thereby driving the paper feeding mechanism to operate; in the second position, the active gear meshes with the rack and rotates in the second direction to move on the rack, thereby being used for driving the operation of the image reading mechanism.

The above-mentioned power switching device and image processing device drive the active gear to rotate through the driver. After driving the first functional mechanism to complete reciprocal movement on the rack, the active gear moves off the rack to connect with the transmission mechanism to drive the second functional mechanism to rotate to achieve rotational movement. After completion, the active gear is reversed, and the locking mechanism restricts the reversal of the transmission mechanism, so that the active gear is moved back to the rack for translational movement. In this way, the purpose of switching between a reciprocating translational movement and a rotational movement of a power source is achieved.

Figure 1:
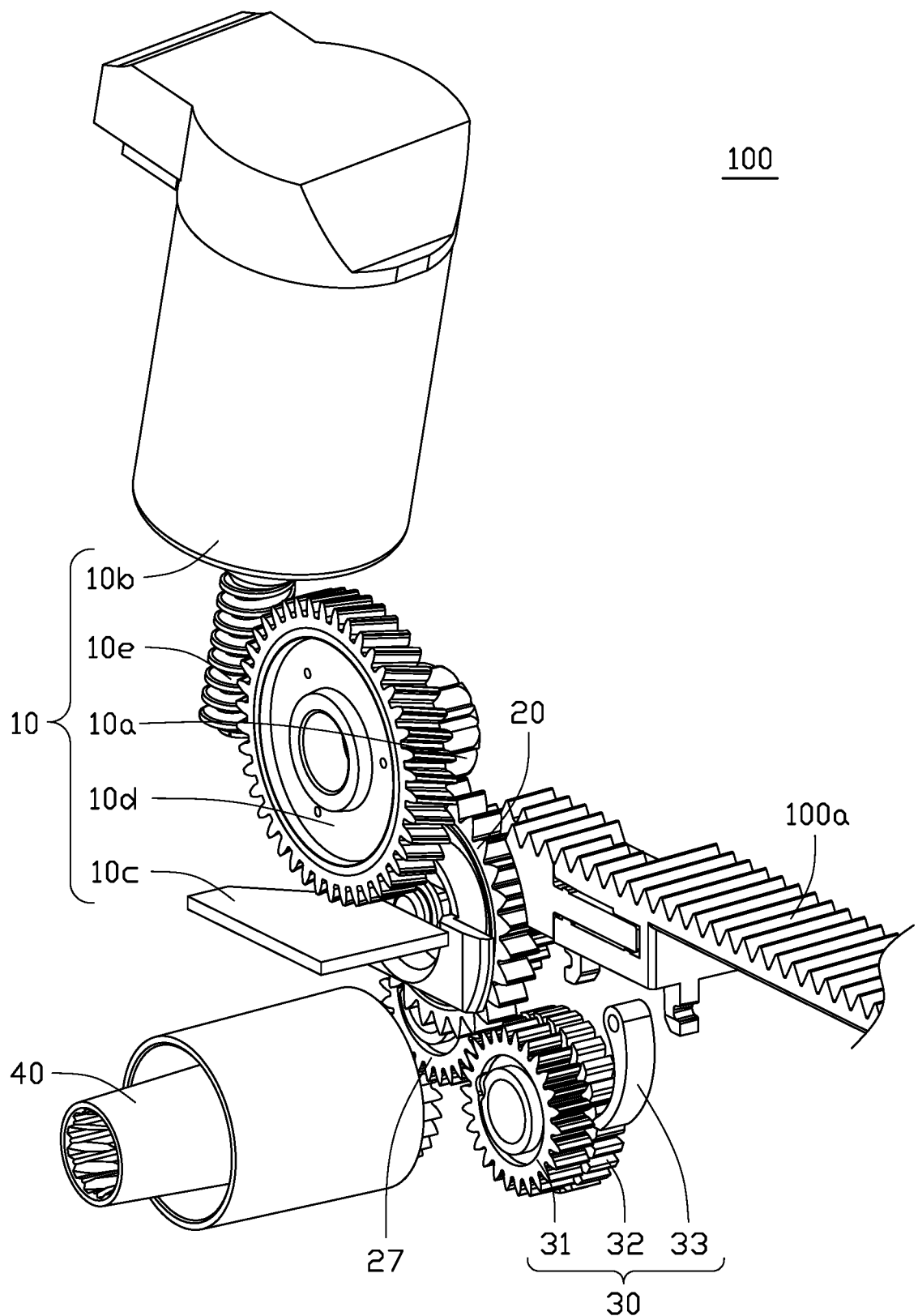
FIG. 1 is a perspective schematic diagram of a power switching device according to an embodiment of the application.

SYMBOL DESCRIPTION OF MAIN COMPONENTS power switching device 100
rail 100a
active mechanism 10
active gear 10a
driver 10b
pushing member 10c
curved surface 10c1
worm gear 10d
worm 10e
transmission mechanism 20
first transmission gear 21
first toothing portion 21a
second transmission gear 22
second toothing portion 22a
resilient member 23
fixed shaft 24
pressing member 25
extension piece 25a
round corner 25a1
limiting member 26
third transmission gear 27
locking mechanism 30
locking gear 31
ratchet wheel 32
pawl 33
functional gear 40
image processing device 200
image reading mechanism 210
paper feeding mechanism 220

DETAILED DESCRIPTION

The technical solutions of the present application will be described below in conjunction with the drawings in the embodiments of the present application. Obviously, the described embodiments are only a part of the implementations of the present application, rather than all of the implementations.

It should be noted that when a component is referred to as being "fixed to" another component, it can be directly fixed or indirectly fixed to another component. When a component is considered to be "connected" to another component, it can be directly connected or indirectly connected to another component. When a component is considered to be "installed on" another component, it can be directly installed or indirectly installed on another component. The terms "vertical", "horizontal", "left", "right" and similar expressions used herein are for illustrative purposes only.

Unless otherwise defined, all technical and scientific terms used herein have the same meaning as commonly understood by those skilled in the technical field of this application. The terminology used in the specification of the application herein is only for the purpose of describing specific embodiments, and is not intended to limit the application. The term "or/and" as used herein includes any and all combinations of one or more related listed items.

An embodiment of the present application provides a power switching device for switching power between a first functional mechanism and a second functional mechanism, including:

A translation mechanism, including a rack;

An active mechanism including an active gear and a driver, the driver is connected to the active gear, the active gear is used to connect with a first functional mechanism, and the driver can drive the active gear to rotate in a first direction or a second direction opposite to the first direction;

A transmission mechanism for connecting with the second functional mechanism; and A locking mechanism connected to the transmission mechanism for limiting the transmission mechanism to transmit in a single direction;

The active gear can be switched between a first position and a second position; in the first position, the active gear is connected to the transmission mechanism and rotates in the first direction to drive the transmission mechanism to rotate, thereby driving the second functional mechanism to operate; in the second position, the active gear meshes with the rack and rotates in the second direction to move on the rack, thereby being used for driving the operation of the first functional mechanism.

The above-mentioned power switching device and image processing device drive the active gear to rotate through the driver. After driving the first functional mechanism to complete reciprocal movement on the rack, the active gear moves off the rack to connect with the transmission mechanism to drive the second functional mechanism to rotate to achieve rotational movement. After completion, the active gear is reversed, and the locking mechanism restricts the reversal of the transmission mechanism, so that the active gear is moved back to the rack for translational movement.

In this way, the purpose of switching between a reciprocating translational movement and a rotational movement of a power source is achieved.

In the following, some embodiments of the present application will be described in detail with reference to the accompanying drawings. If there is no conflict, the following embodiments and features in the embodiments can be combined with each other.

Figure 2:
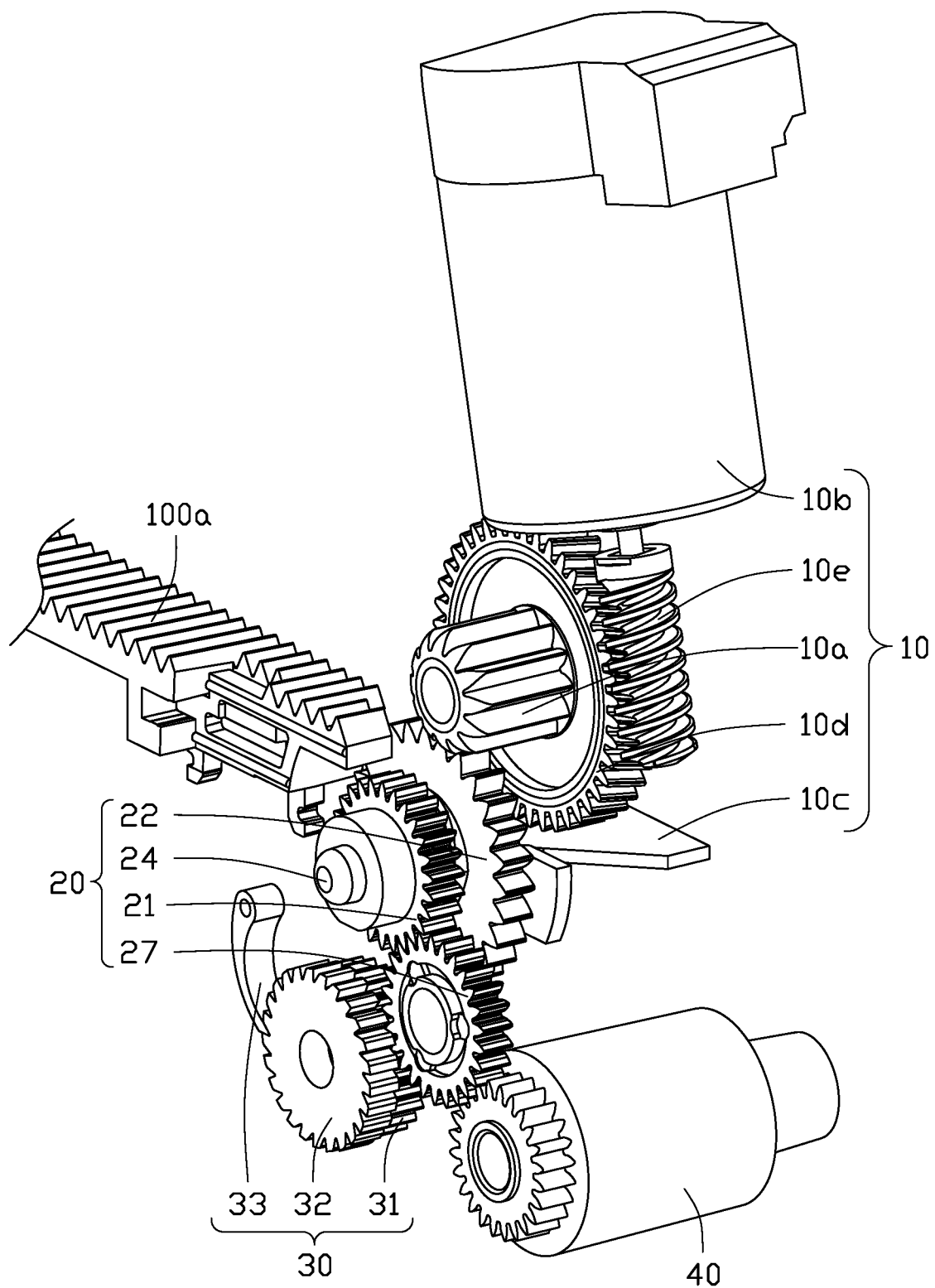
FIG. 2 is a perspective schematic diagram of the power switching device in FIG. 1 from another perspective.

Referring to FIGS. 1 and 2, an embodiment of the present application provides a power switching device 100 for switching a power source between a first functional mechanism (translational movement) and a second functional mechanism (rotational movement). The power switching device 100 includes:

A translation mechanism includes a rack 100a, and the position of the rack 100a is fixed;

An active mechanism 10, including:

An active gear 10a which can mesh with the rack 100a to convert its own rotation into translational reciprocating movement on the rack 100a, and the active gear 10a is used to connect with the first functional mechanism to realize the reciprocating translational movement of the first functional mechanism;

A driver 10b which can drive the active gear 10a to move along the rack 100a at any time. The driver 10b is connected to the active gear 10a for driving the active gear 10a to rotate in a first direction or a second direction opposite to the first direction. In one embodiment, the driver 10b is a motor;

The transmission mechanism 20 is located outside one end of the rack 100a and is used to connect with the second functional mechanism. After the active gear 10a finishes a translational movement operation and is moved out of the end of the rack 100a, the active gear 10a is connected to the transmission mechanism 20. At this time, when the driver 10b continues to drive the active gear 10a to rotate, the transmission mechanism 20 is used to transmit the rotation of the active gear 10a, so that the second functional mechanism performs the rotation operation;

A locking mechanism 30 which is connected to the transmission mechanism 20. After the active gear 10a completes the rotational movement operation and the driver 10b drives the active gear 10a to rotate in a reverse direction, the locking mechanism 30 is used to restrict the transmission mechanism 20 to rotate in a single direction and not rotate in the reverse direction. When the transmission mechanism 20 is stuck and stops rotating, the rotation of the active gear 10a is converted into translational motion, and the active gear 10a is moved back to the rack 100a for translational motion;

In one embodiment, the second functional mechanism includes a functional gear 40, and the functional gear 40 is used to receive the rotation of the transmission mechanism 20 to realize the function of rotational motion.

The active gear 10a can be switched between a first position and a second position. In the first position, the active gear 10a is connected to the transmission mechanism 20 and rotates in a first direction to drive the functional gear 40 to rotate. In the second position, the active gear 10a meshes with the rack 100a and rotates in the first direction or a second direction to reciprocate on the rack 100a.

Figure 3:
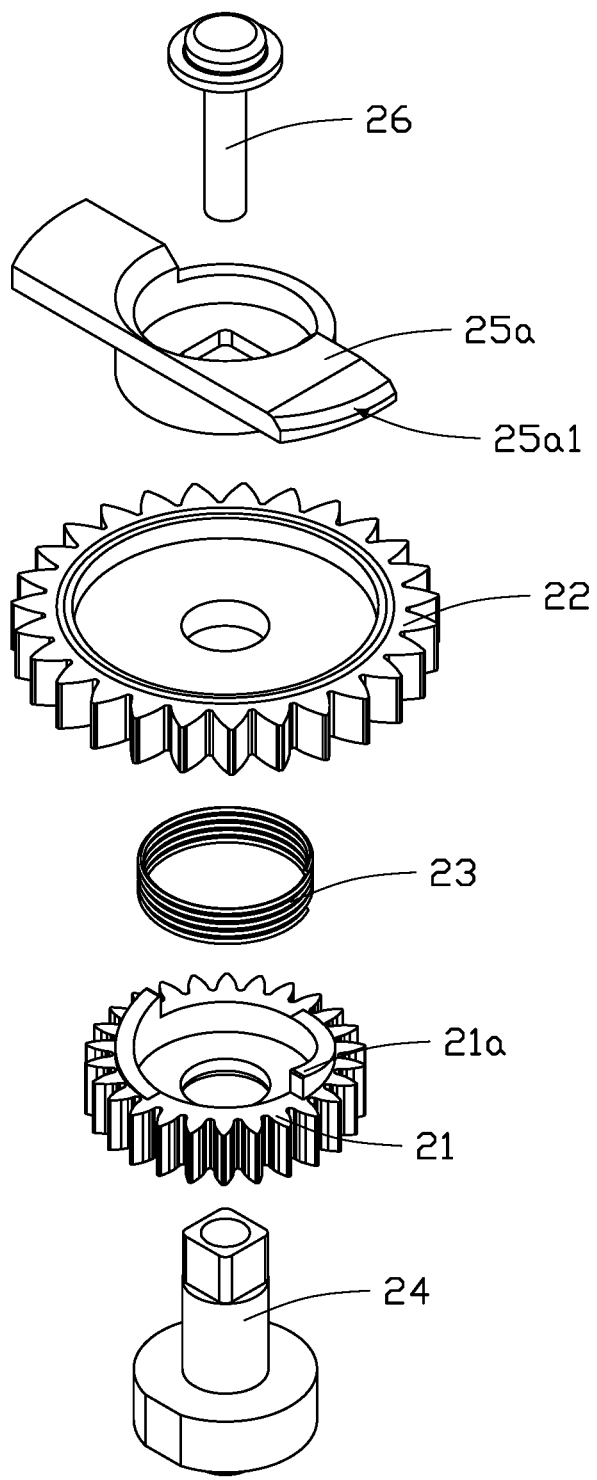
FIG. 3 is an exploded view of a transmission mechanism in FIG. 1.
Figure 6:
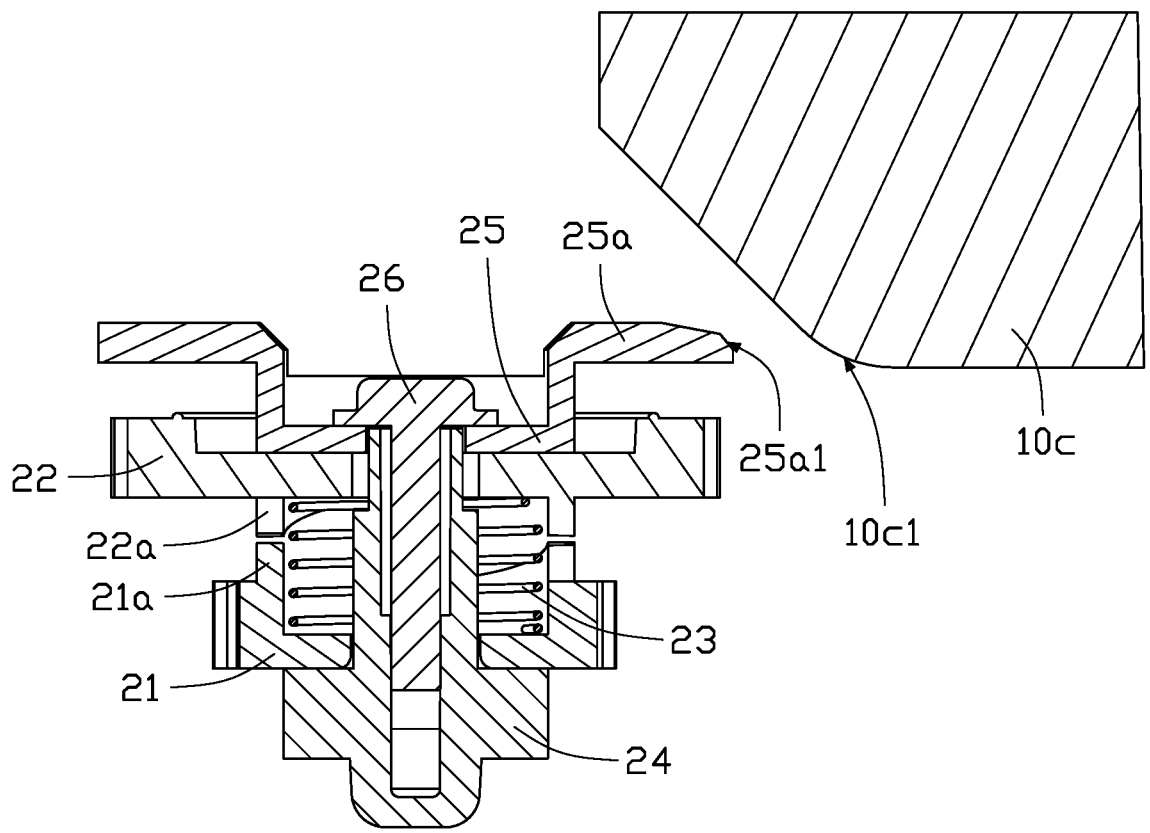
FIG. 6 is a cross-sectional view taken along line A-A in FIG. 4.

Referring to FIG. 3, the transmission mechanism 20 includes:

A first transmission gear 21 meshing with the functional gear 40 (directly or indirectly), and a first toothing portion 21a is provided on a side surface of the first transmission gear 21;

A second transmission gear 22 arranged coaxially with the first transmission gear 21, and a side of the second transmission gear 22 is provided with a second toothing portion 22a (see FIG. 6). The second toothing portion 22a is used to mesh with the first toothing portion 21a, so that the second transmission gear 22 drives the first transmission gear 21 to rotate;

The resilient member 23 is connected to the first transmission gear 21 and the second transmission gear 22 and is used to push the second transmission gear 22 away from the first transmission gear 21, so that the second transmission gear 22 is separated from the active gear 10a. In one embodiment, the resilient member 23 is a spring. A top of the second transmission gear 22 is flush with a height of the rack 100a, which facilitates movement of the active gear 10a between the two.

Referring to FIGS. 4, 5, 6, and 7, the active mechanism 10 further includes a pushing member 10c. The pushing member 10c moves with the active gear 10a. When the active gear 10a moves to the transmission mechanism 20, the pushing member 10c is used to push the second transmission gear 22 in the direction of the first transmission gear 21, the resilient member 23 is compressed after pushing, the second transmission gear 22 meshes with the active gear 10a, and the second toothing portion 22a meshes with the first toothing portion 21a. When the active gear 10a reverses and separates from the transmission mechanism 20, the resilient member 23 releases an elastic force to push the second transmission gear 22 away from the first transmission gear 21, and the second toothing portion 22a separates from the first toothing portion 21a. A structural function of the first transmission gear 21, the second transmission gear 22, and the resilient member 23 is to facilitate a sensor (not shown) of the power switching device 100 to sense a position change of the active gear 10a, so as to send a signal to other devices cooperating with the power switching device 100. When the pushing member 10c compresses the resilient member 23, the sensor senses that the active gear 10a starts the rotational movement operation. When the pushing member 10c separates from the resilient member 23, the sensor senses that the active gear 10a starts the translational movement operation.

In one embodiment, the first toothing portion 21a and the second toothing portion 22a are wedge-shaped blocks. The first toothing portion 21a has two first wedge-shaped teeth, which are symmetrically arranged on a side of the first transmission gear 21 facing the second transmission gear 22. Similarly, the second toothing portion 22a has two second wedge-shaped teeth, which are symmetrically arranged on a side of the second transmission gear 22 facing the first transmission gear 21. After the first toothing portion 21a and the second toothing portion 22a mesh and a vertical surface of the second wedge-shaped teeth press a vertical surface of the first wedge-shaped teeth, the second transmission gear 22 drives the first transmission gear 21 to rotate to realize a transmission function. When the active gear 10a rotates in the reverse direction, after the locking mechanism 30 locks the first transmission gear 21 and the second transmission gear 22 rotates in the reverse direction to a certain angle, a curved surface of the second wedge-shaped teeth is in contact with a curved surface of the first wedge-shaped teeth. Because of pushing by the pushing member 10c, a distance between the second transmission gear 22 and the first transmission gear 21 is fixed, and the first wedge-shaped teeth hold the second wedge-shaped teeth, so that the second transmission gear 22 cannot rotate, and the active gear 10a is moved back to the rack 100a.

Figure 7:
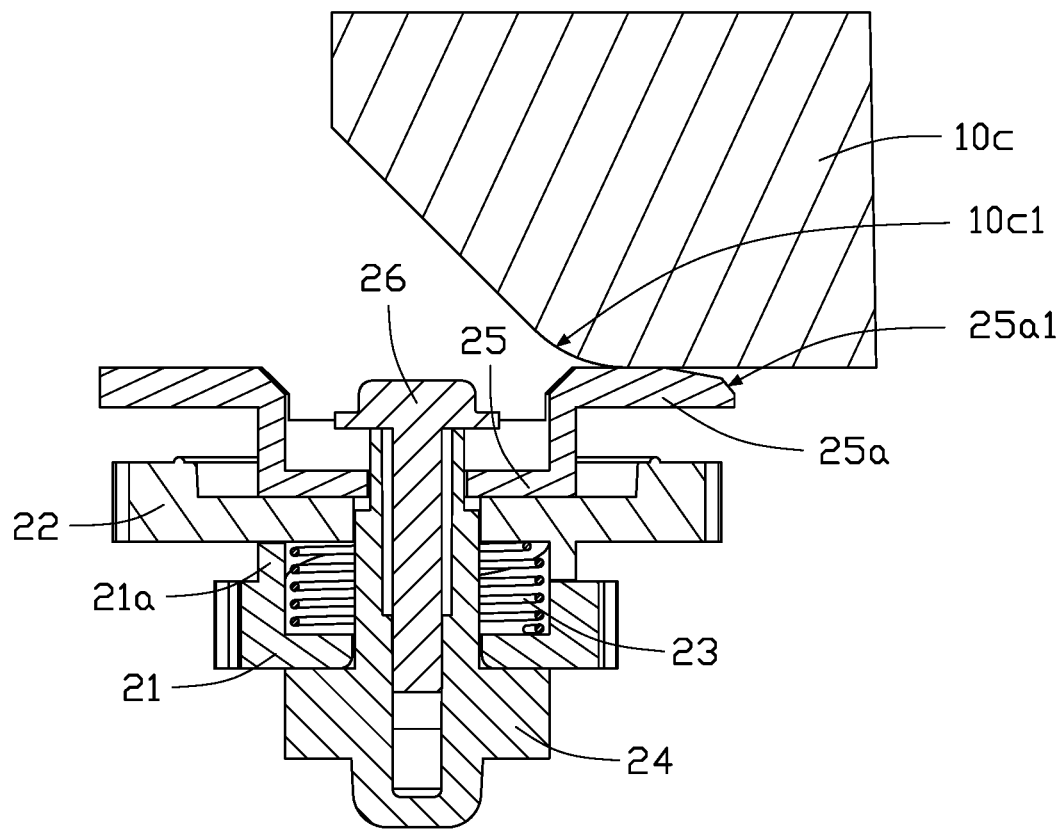
FIG. 7 is a cross-sectional view taken along line B-B in FIG. 5.

Referring to FIG. 3, FIG. 6, and FIG. 7, the transmission mechanism 20 further includes:

A fixed shaft 24 having a fixed position, and the first transmission gear 21, the second transmission gear 22, and the resilient member 23 are all sleeved on the fixed shaft 24;

A pressing member 25 sleeved on the fixed shaft 24 and located on a side of the second transmission gear 22 away from the resilient member 23 for facilitating contact with the pushing member 10c and pushing the second transmission gear 22;

A limiting member 26 provided on one end of the fixed shaft 24 adjacent to the pressing member 25 and used to limit positions of the first transmission gear 21, the second transmission gear 22, the resilient member 23, and the pressing member 25 to prevent them from sliding out of the fixed shaft 24. In one embodiment, the limiting member 26 is a screw.

Referring to FIG. 3, FIG. 6, and FIG. 7, the pressing member 25 is provided with an extension piece 25a. The extension piece 25a extends out of the second transmission gear 22 in the direction of the pushing member 10c to prevent the second transmission gear 22 from directly contacting the pushing member 10c. A side of the pushing member 10c adjacent to the extension piece 25a is provided with a curved surface 10c1. When the pushing member 10c moves toward the pressing member 25, a top of the curved surface 10c1 first contacts the extension piece 25a, and the curved surface 10c1 continues to translate so that the extension piece 25a slides down relative to the curved surface 10c1 until contacting a bottom of the curved surface 10c1, so that the extension piece 25a is pressed during translation of the active gear 10a, that is, the second transmission gear 22 is pushed toward the first transmission gear 21. In one embodiment, the pushing member 10c is in the shape of a sheet, and a plane of the sheet is perpendicular to the extension piece 25a. One end of the extension piece 25a adjacent to the pushing member 10c has a round corner 25a1 to reduce friction.

Figure 4:
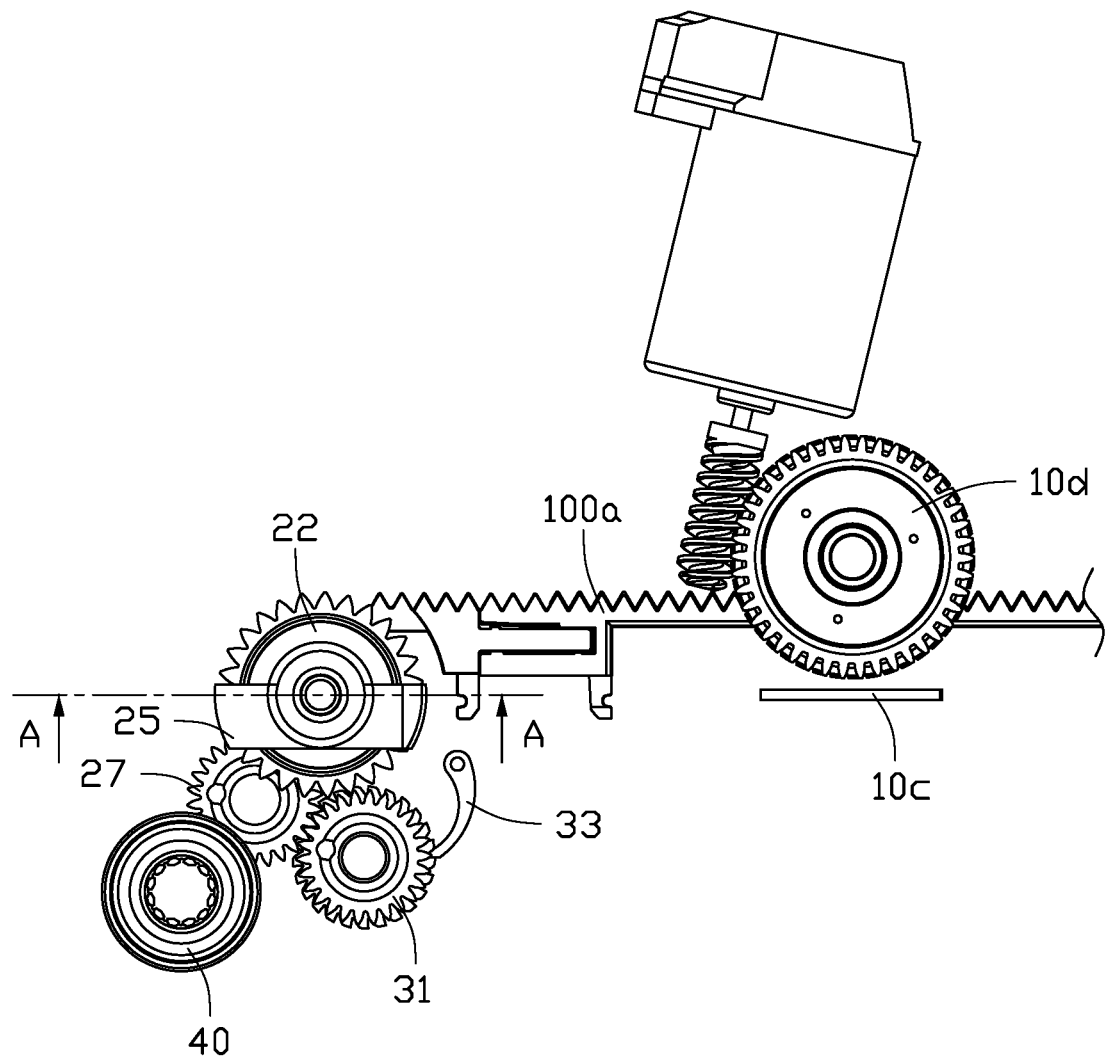
FIG. 4 is a side view of the power switching device in FIG. 1 when a translational movement is realized.
Figure 5:
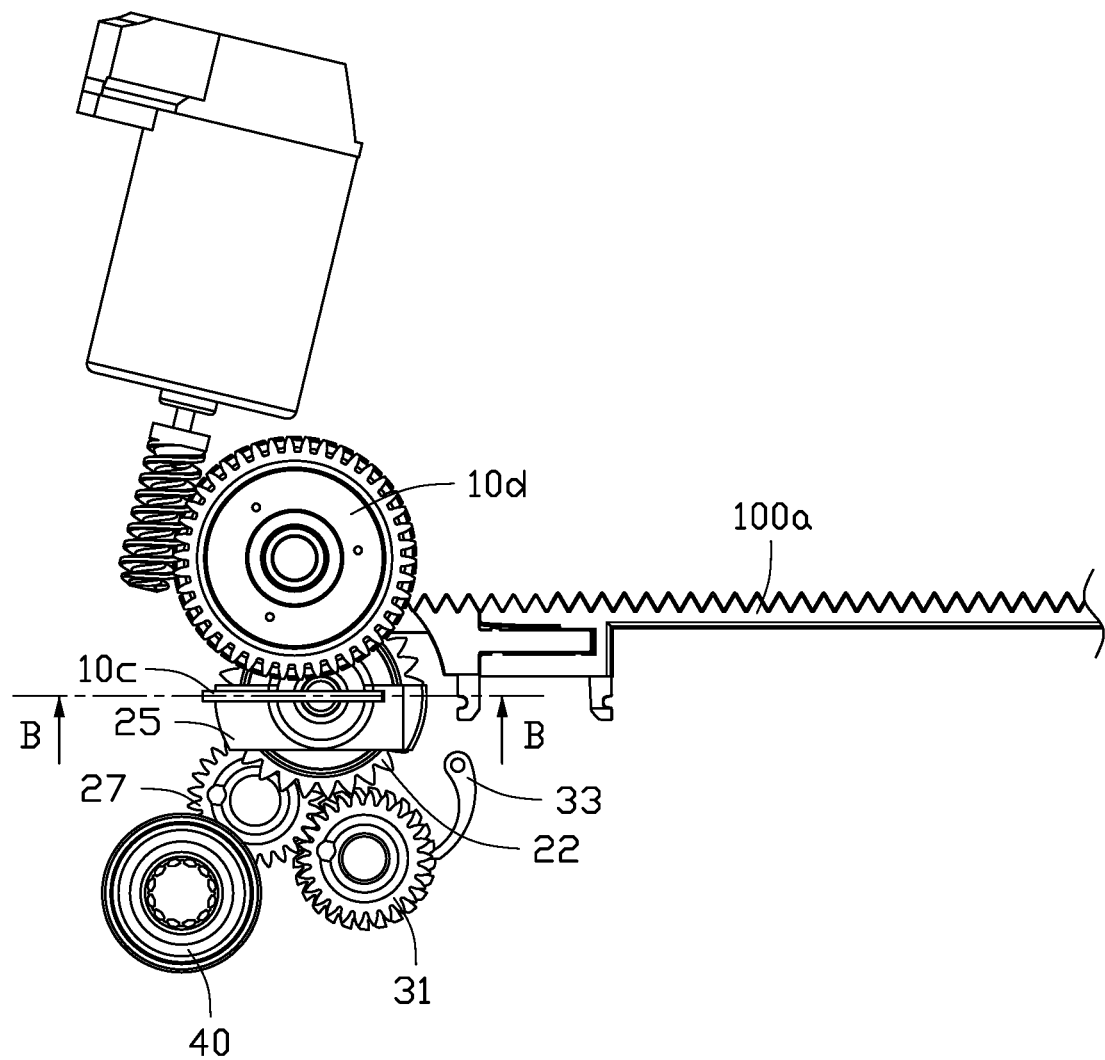
FIG. 5 is a side view of the power switching device in FIG. 1 when a rotational movement is realized.

Referring to FIG. 4 and FIG. 5, the transmission mechanism 20 further includes a third transmission gear 27. The third transmission gear 27 meshes with the first transmission gear 21 and the functional gear 40 for transmitting the rotation of the first transmission gear 21 to the functional gear 40.

Referring to FIGS. 1 and 2, the locking mechanism 30 includes a locking gear 31, a ratchet wheel 32 and a pawl 33. The locking gear 31 and the ratchet wheel 32 are coaxially fixedly connected. The locking gear 31 meshes with the third transmission gear 27. The pawl 33 is used to restrict the ratchet wheel 32 and the locking gear 31 from reversing to restrict the third transmission gear 27 from reversing, and thereby restrict the first transmission gear 21 and the second transmission gear 22 from reversing.

Referring to FIG. 1 and FIG. 2, the active mechanism 10 further includes a worm gear 10d and a worm 10e. The worm gear 10d is coaxially and fixedly connected with the active gear 10a. One end of the worm 10e is connected to the driver 10b, and the other end engages the worm gear 10d. The driver 10b is used to drive the worm 10e to rotate, and the worm 10e drives the worm gear 10d to rotate, which in turn drives the active gear 10a to rotate. In one embodiment, the worm gear 10d and the active gear 10a jointly form a double gear.

Figure 8:
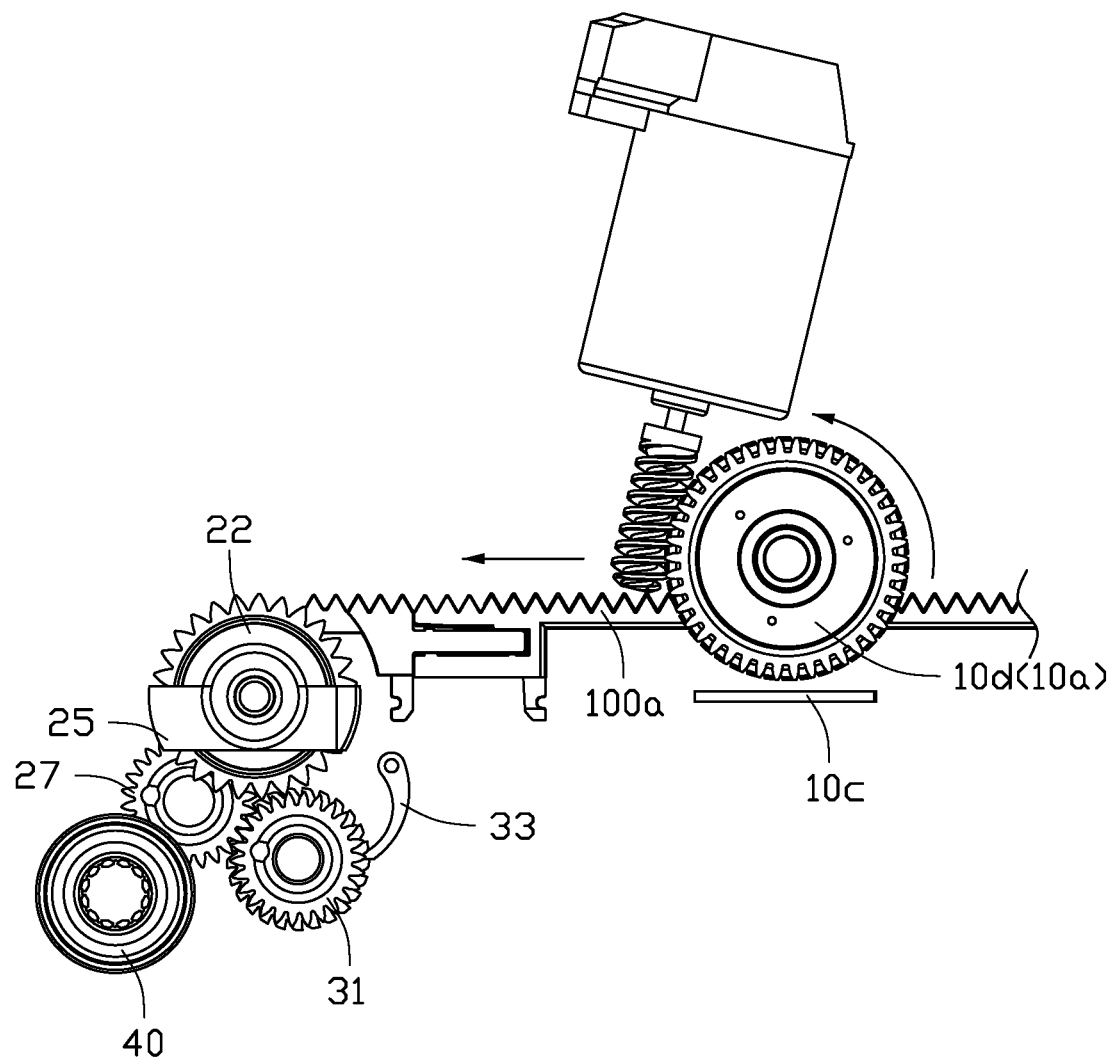
FIG. 8 is a side view of an operating state of the power switching device in FIG. 5 when switching from a translational movement to a rotational movement.

Referring to FIG. 8, when the active gear 10a starts to rotate counterclockwise on the rack 100a, the active gear 10a will move on the rack 100a toward the transmission mechanism 20 until the active gear 10a meshes with the transmission mechanism 20.

Figure 9:
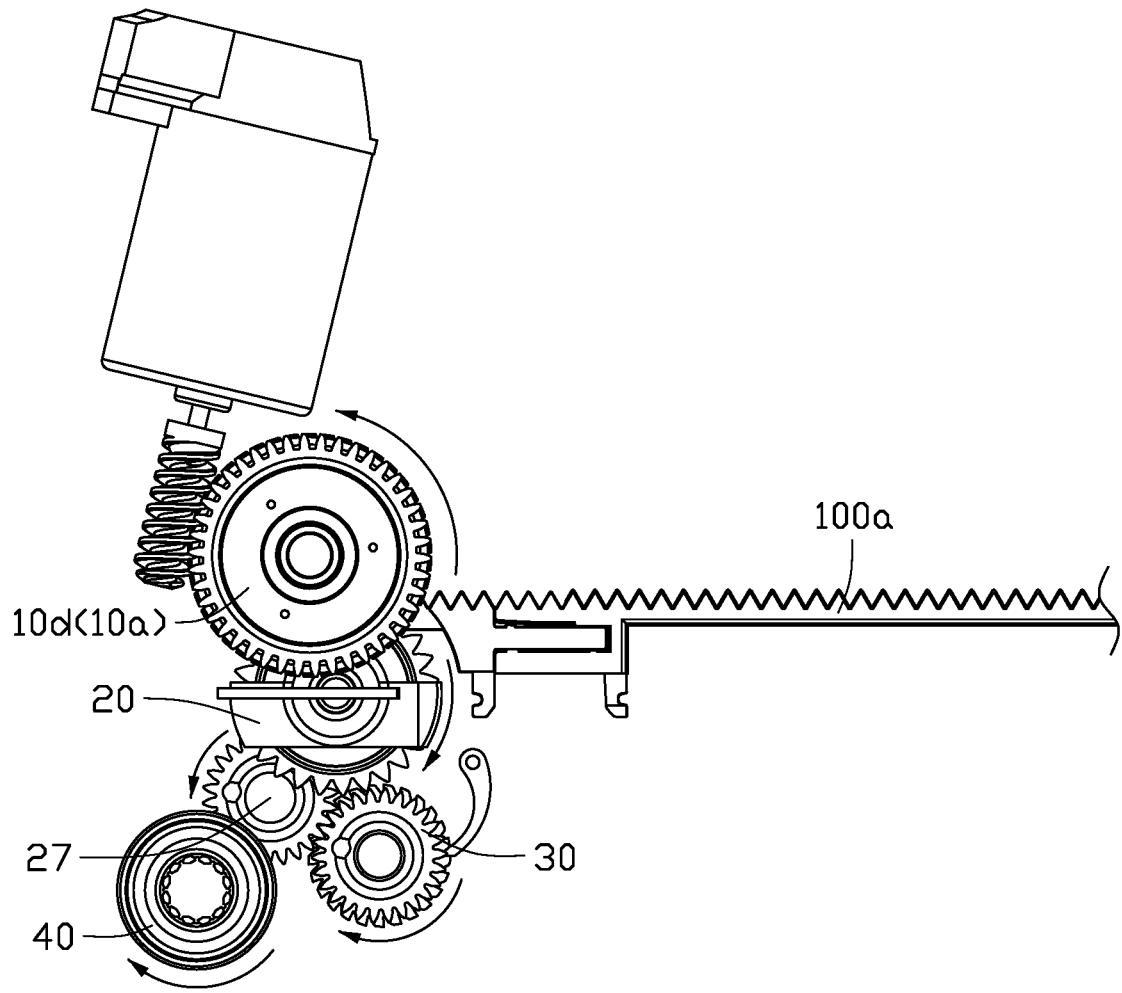
FIG. 9 is a side view of an operating state of the power switching device in FIG. 8 realizing rotational movement.

Referring to FIG. 9, when the active gear 10a meshes with the transmission mechanism 20, the transmission mechanism 20 is driven to rotate clockwise and the third transmission gear 27 is rotated counterclockwise. Finally, the functional gear 40 is driven to rotate clockwise, and the locking mechanism 30 rotates clockwise idly.

Figure 10:
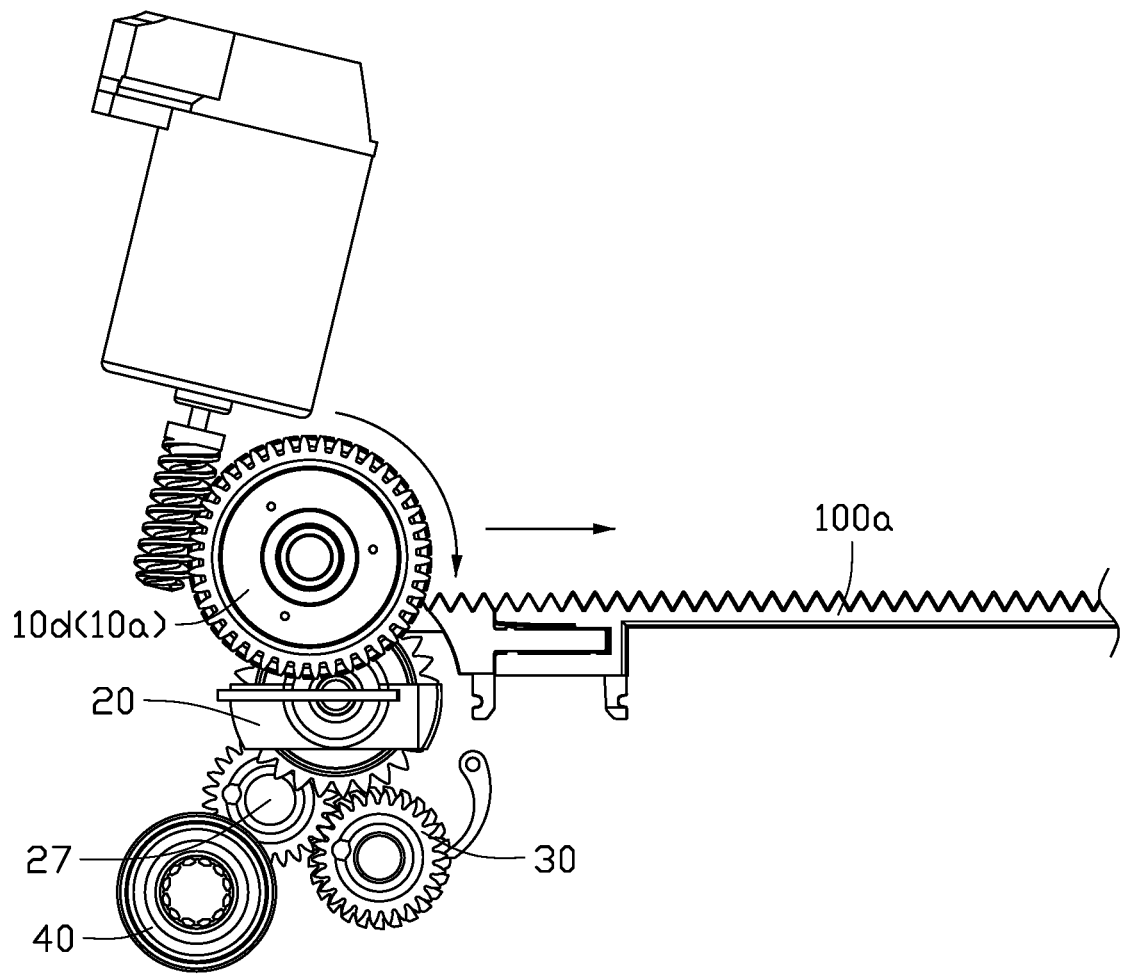
FIG. 10 is a side view of an operating state when an active gear of FIG. 9 is reversed.

Referring to FIG. 10, when the active gear 10a rotates clockwise, since the locking mechanism 30 is locked by the pawl 33 and cannot rotate counterclockwise, the third transmission gear 27, the transmission mechanism 20, and the functional gear 40 are also locked and unable to rotate, and the functional gear 40 stops. At this time, the active gear 10a can only move toward the rack 100a in the direction of the arrow.

Figure 11:
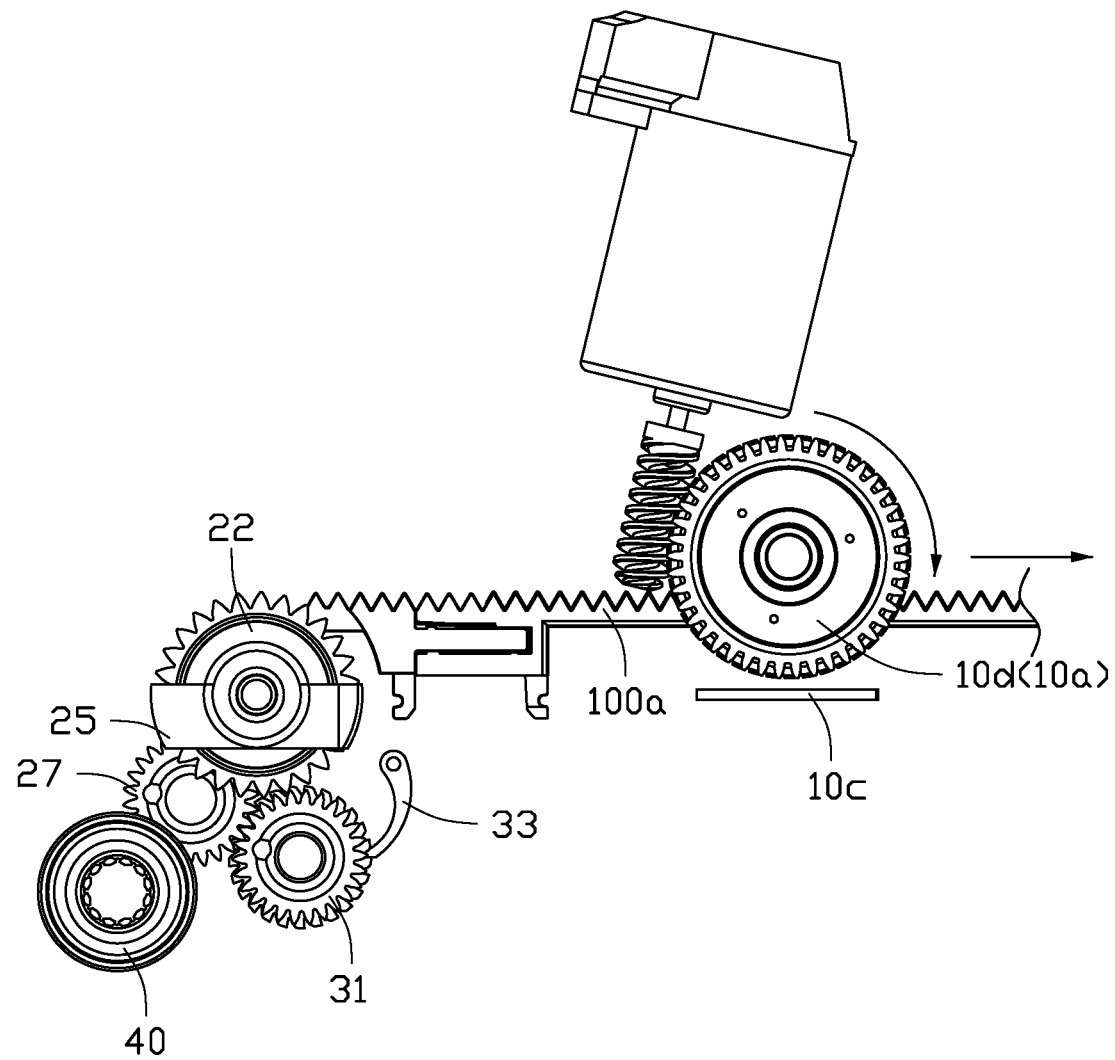
FIG. 11 is a side view of an operating state when the power switching device of FIG. 10 is switched from a rotational motion to a translational motion.

Referring to FIG. 11, after the active gear 10a meshes with the rack 100a, the active gear 10a continues to rotate clockwise and moves away from the transmission mechanism 20 in the direction of the arrow.

Figure 12:
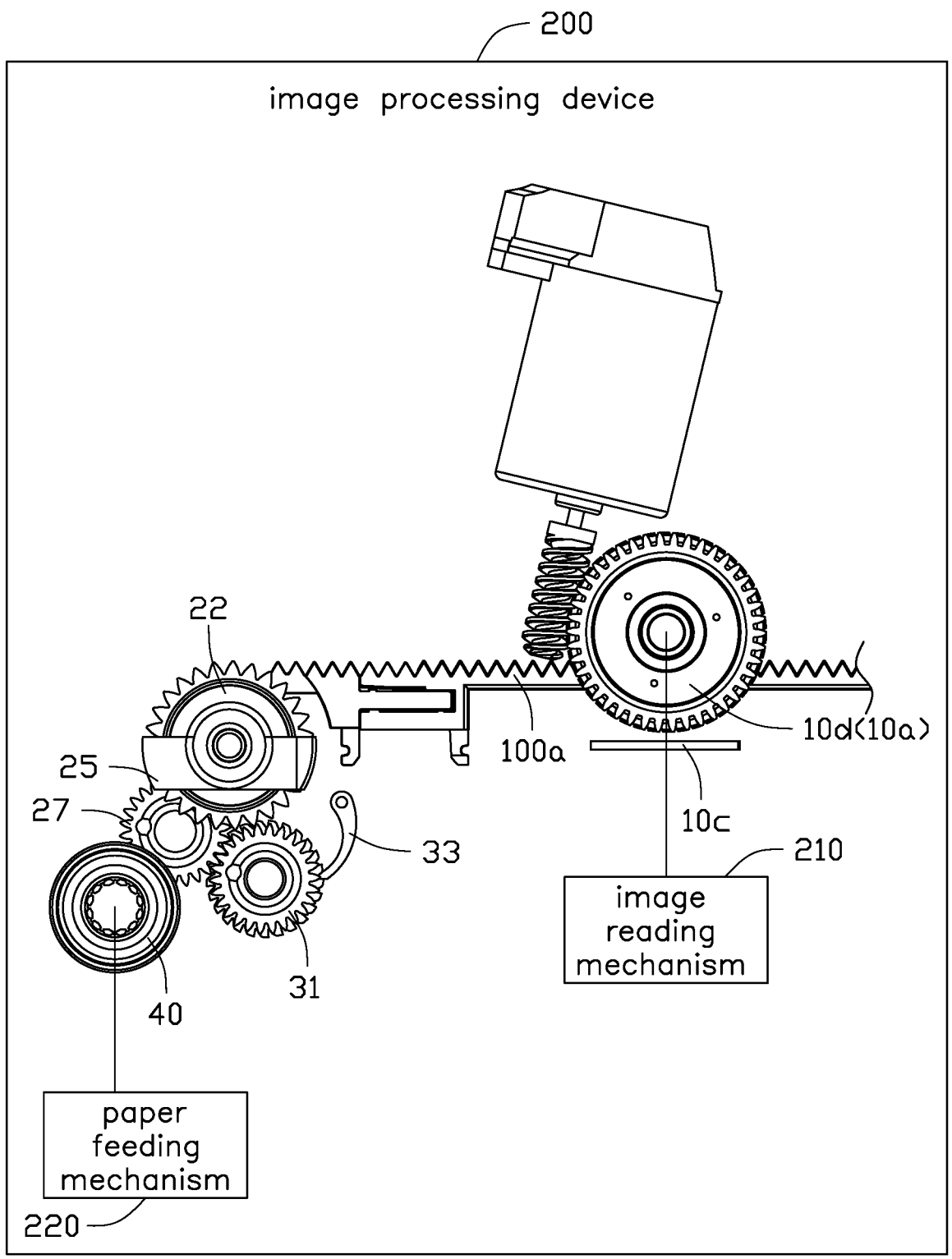
FIG. 12 is a schematic diagram of an image processing device.

Referring to FIG. 12, the present application also provides an image processing device 200, including an image reading mechanism 210, a paper feeding mechanism 220 and the power switching device 100. The translation mechanism is connected to the image reading mechanism 210. When the active gear 10a reciprocates on the rack 100a, the image reading mechanism 210 is driven for scanning. The functional gear 40 is connected to the paper feeding mechanism 220. When the scanning is completed, the active gear 10a moves out of the rack 100a and connects to the transmission mechanism 20, and the active gear 10a drives the functional gear 40 to rotate to drive the paper feeding mechanism 220 to feed paper. After the paper feeding is finished, the driver 10b drives the active gear 10a to reverse rotate and move back onto the rack 100a for reciprocating movement to scan the newly fed paper. The above-described operations are repeated to automatically scan multiple papers.

It is understandable that, in other embodiments, the third transmission gear 27 can be a structure composed of other numbers of engaged transmission wheels, such as adding a fourth transmission gear to engage the third transmission gear and the functional gear. The locking mechanism 30 can also be another structure. For example, in another embodiment, the ratchet wheel 32 and the pawl 33 can be replaced with a one-way bearing mounted to a rotation shaft of the locking gear 31 to realize one-way rotation.

The power switching device 100 and the image processing device 200 described above drive the active gear 10a to rotate through the driver. After completing the reciprocating translation movement on the rack 100a, the active gear 10a is moved off the rack 100a and connected to the transmission mechanism 20 to drive the functional gear 40 to rotate to achieve rotational movement. After completion, the locking mechanism 30 restricts the reverse rotation of the transmission mechanism 20, so that the active gear 10a is moved back to the rack 100a for translational movement. In this way, a power source is switched between the reciprocating translational movement and the rotational movement, that is, switching power between scanning and feeding paper.

The above embodiments are only used to illustrate the technical solutions of the application and not to limit them. Although the application has been described in detail with reference to the above preferred embodiments, those of ordinary skill in the art should understand that the technical solutions of the application can be modified or equivalently replaced, and none should deviate from the spirit and scope of the technical solution of this application. Those skilled in the art can also make other changes within the spirit of this application, as long as they do not deviate from the technical effects of this application. These changes made according to the spirit of this application should all be included in the scope disclosed in this application.

What is claimed is:

1. A power switching device for switching power between a first functional mechanism and a second functional mechanism, comprising:
a translation mechanism comprising a rack;
an active mechanism comprising an active gear and a driver, the driver is connected to the active gear, the active gear is used to connect with the first functional mechanism, and the driver can drive the active gear to rotate in a first direction or a second direction opposite to the first direction;
a transmission mechanism for connecting with the second functional mechanism; and
a locking mechanism connected to the transmission mechanism for restricting the transmission mechanism to transmit in a single direction; wherein:
the active gear can be switched between a first position and a second position;
in the first position, the active gear is connected to the transmission mechanism and rotates in the first direction to drive the transmission mechanism to rotate, thereby driving the second functional mechanism to operate; and
in the second position, the active gear meshes with the rack and rotates in the first direction or the second direction to reciprocate on the rack so as to drive the first functional mechanism to operate.

2. The power switching device of claim 1, wherein the transmission mechanism comprises:
a first transmission gear meshing with the second functional mechanism and comprising a first toothing portion; and
a second transmission gear coaxial with the first transmission gear and comprising:
a second toothing portion used to engage with the first toothing portion to drive the first transmission gear to rotate; and
a resilient member connected to the second transmission gear for pushing the second transmission gear in a direction away from the first transmission gear, so that the second transmission gear is separated from the active gear; wherein:
the active mechanism further comprises a pushing member moving along with the active gear;
when the active gear moves to the transmission mechanism, it pushes the second transmission gear in the direction of the first transmission gear, so that the second transmission gear meshes with the active gear, and the second toothing portion engages with the first toothing portion.

3. The power switching device of claim 2, wherein the transmission mechanism further comprises:
a fixed shaft, the first transmission gear, the second transmission gear, and the resilient member are sleeved on the fixed shaft;
a pressing member sleeved on the fixed shaft and located on a side of the second transmission gear away from the resilient member, and used for contacting the pushing member and pushing the second transmission gear; and
a limiting member provided at an end of the fixed shaft adjacent to the pressing member, and used for limiting the first transmission gear, the second transmission gear, the resilient member, and the pressing member.

4. The power switching device of claim 3, wherein:
the pressing member is provided with an extension piece, and the extension piece extends in the direction of the pushing member;
a side of the pushing member adjacent to the extension piece is provided with a curved surface;
when the pushing member moves toward the pressing member, the pushing member causes the extension piece to slide relative to the curved surface to press the extension piece, and then push the second transmission gear in the direction of the first transmission gear.

5. The power switching device of claim 4, wherein the extension piece is provided with a round corner at an end adjacent to the pushing member.

6. The power switching device of claim 2, wherein:
the locking mechanism comprises a locking gear, a ratchet wheel, and a pawl;
the locking gear is coaxially fixedly connected with the ratchet wheel;
the locking gear is meshed with the first transmission gear;
the pawl is used to restrict the ratchet wheel and the locking gear from rotating in a reverse direction, thereby restricting the transmission mechanism from rotating in a reverse direction.

7. The power switching device of claim 1, wherein:
the driving mechanism further comprises a worm gear and a worm;
the worm gear is coaxially fixedly connected with the active gear;
one end of the worm is connected to the driver, and the other end engages with the worm gear;
the driver is used to drive the worm to rotate, so as to drive the worm gear and the active gear to rotate.

8. An image processing device comprising:
an image reading mechanism;
a paper feeding mechanism; and
a power switching device connected to the image reading mechanism and the paper feeding mechanism; wherein:
the power switching device is configured to switch a power source between the image reading mechanism and the paper feeding mechanism;
the power switching device provides reciprocating translational movement to the image reading mechanism; and
the power switching device provides rotational movement to the paper feeding mechanism;
the power switching device comprises:
a translation mechanism comprising a rack;
an active mechanism comprising an active gear and a driver, the driver is connected to the active gear, the active gear is used to connect with the image reading mechanism, and the driver can drive the active gear to rotate in a first direction or a second direction opposite to the first direction;
a transmission mechanism for connecting with the second functional mechanism; and
a locking mechanism connected to the transmission mechanism for restricting the transmission mechanism to transmit in a single direction; wherein:
the active gear can be switched between a first position and a second position;
in the first position, the active gear is connected to the transmission mechanism and rotates in the first direction to drive the transmission mechanism to rotate, thereby driving the paper feeding mechanism to operate; and in the second position, the active gear meshes with the rack and rotates in the first direction or the second direction to reciprocate on the rack so as to drive the image reading mechanism to operate.

9. The image processing device of claim 8, wherein the transmission mechanism comprises:
a first transmission gear meshing with the second functional mechanism and comprising a first toothing portion; and
a second transmission gear coaxial with the first transmission gear and comprising:
a second toothing portion used to engage with the first toothing portion to drive the first transmission gear to rotate; and
a resilient member connected to the second transmission gear for pushing the second transmission gear in a direction away from the first transmission gear, so that the second transmission gear is separated from the active gear; wherein:
the active mechanism further comprises a pushing member moving along with the active gear;
when the active gear moves to the transmission mechanism, it pushes the second transmission gear in the direction of the first transmission gear, so that the second transmission gear meshes with the active gear, and the second toothing portion engages with the first toothing portion.

10. The image processing device of claim 9, wherein:
the locking mechanism comprises a locking gear, a ratchet wheel, and a pawl;
the locking gear is coaxially fixedly connected with the ratchet wheel;
the locking gear is meshed with the first transmission gear;
the pawl is used to restrict the ratchet wheel and the locking gear from rotating in a reverse direction, thereby restricting the transmission mechanism from rotating in a reverse direction.

11. The image processing device of claim 9, wherein the transmission mechanism further comprises:
a fixed shaft, the first transmission gear, the second transmission gear, and the resilient member are sleeved on the fixed shaft;
a pressing member sleeved on the fixed shaft and located on a side of the second transmission gear away from the resilient member, and used for contacting the pushing member and pushing the second transmission gear; and
a limiting member provided at an end of the fixed shaft adjacent to the pressing member, and used for limiting the first transmission gear, the second transmission gear, the resilient member, and the pressing member.

12. The image processing device of claim 11, wherein:
the pressing member is provided with an extension piece, and the extension piece extends in the direction of the pushing member;
a side of the pushing member adjacent to the extension piece is provided with a curved surface;
when the pushing member moves toward the pressing member, the pushing member causes the extension piece to slide relative to the curved surface to press the extension piece, and then push the second transmission gear in the direction of the first transmission gear.

13. The image processing device of claim 12, wherein the extension piece is provided with a round corner at an end adjacent to the pushing member.

14. The image processing device of claim 13, wherein:
the locking mechanism comprises a locking gear, a ratchet wheel, and a pawl;
the locking gear is coaxially fixedly connected with the ratchet wheel;
the locking gear is meshed with the first transmission gear;
the pawl is used to restrict the ratchet wheel and the locking gear from rotating in a reverse direction, thereby restricting the transmission mechanism from rotating in a reverse direction.

15. The image processing device of claim 14, wherein:
the driving mechanism further comprises a worm gear and a worm;
the worm gear is coaxially fixedly connected with the active gear;
one end of the worm is connected to the driver, and the other end engages with the worm gear;
the driver is used to drive the worm to rotate, so as to drive the worm gear and the active gear to rotate.

16. The image processing device of claim 15, wherein:
the paper feeding mechanism further comprises a functional gear used to receive the rotation of the transmission mechanism 20.

17. The image processing device of claim 16, wherein:
the transmission mechanism further comprises a third transmission gear;
the third transmission gear meshes with the first transmission gear and the functional gear for transmitting the rotation of the first transmission gear to the functional gear.

18. The image processing device of claim 8, wherein:
the driving mechanism further comprises a worm gear and a worm;
the worm gear is coaxially fixedly connected with the active gear;
one end of the worm is connected to the driver, and the other end engages with the worm gear;
the driver is used to drive the worm to rotate, so as to drive the worm gear and the active gear to rotate.

* * * * *